(12) United States Patent
Hoyt (10) Patent No.: US 11,437,830 B2
(45) Date of Patent: Sep. 6, 2022

(54) ARCHITECTURE FOR MULTIPLE PARALLEL SECONDARY PROTECTORS FOR BATTERY CELLS

(71) Applicant: Apple Inc., Cupertino, CA (US)

(72) Inventor: Robert J. Hoyt, San Jose, CA (US)

(73) Assignee: Apple Inc., Cupertino, CA (US)

(*) Notice: Subject to any disclaimer, the term of this patent is extended or adjusted under 35 U.S.C. 154(b) by 111 days.

(21) Appl. No.: 16/987,311

(22) Filed: Aug. 6, 2020

(65) Prior Publication Data
US 2022/0045526 A1    Feb. 10, 2022

(51) Int. Cl.
*H01M 10/44* (2006.01)
*H01M 10/46* (2006.01)
*H02J 7/00* (2006.01)

(52) U.S. Cl.
CPC .......... *H02J 7/0031* (2013.01); *H02J 7/0013* (2013.01); *H02J 7/0047* (2013.01)

(58) Field of Classification Search
CPC ..... H02J 7/0031; H02J 7/00013; H02J 7/0047
USPC .................................. 320/116, 118, 119, 122
See application file for complete search history.

(56) References Cited

U.S. PATENT DOCUMENTS

| 7,659,692 B2 | 2/2010 | Sainomoto et al. |
| 9,293,931 B2 | 3/2016 | Hur |
| 9,362,772 B2 | 6/2016 | Hua et al. |
| 2009/0213511 A1* | 8/2009 | Yoshikawa ........... H02J 7/0014 361/91.1 |
| 2016/0241027 A1* | 8/2016 | Lei ........................ H02J 7/0034 |
| 2020/0083725 A1* | 3/2020 | Singh ................... H01M 10/425 |

FOREIGN PATENT DOCUMENTS

| GB | 2582447 A * | 9/2020 | ............ H02J 7/0016 |
| WO | WO2005/038952 A2 | 4/2005 | |

* cited by examiner

*Primary Examiner* — Edward Tso
(74) *Attorney, Agent, or Firm* — Sterne, Kessler, Goldstein & Fox P.L.L.C.

(57) ABSTRACT

A circuit is disclosed to provide synchronization between parallel-connected battery cells. The circuit includes at least a plurality of battery cells connected in parallel to an output voltage rail of the battery pack. The circuit may further include a first indicator resistor having a first terminal and a second terminal, where the first terminal is connected to the output voltage rail. The circuit may further include a plurality of charge protection circuits corresponding to the plurality of battery cells and include at least a first charge protection circuit configured to detect that a first battery cell corresponding to the first charge protection circuit has triggered one or more undesirable charge protection states to enter a charge protection mode and shut off a first charge transistor for the first battery cell to prevent charging of the first battery cell in response to the first battery cell entering the charge protection mode. The circuit can further pull down a voltage of the first indicator resistor at the second terminal in response to the first battery cell entering the charge protection mode, where the voltage pull down provides an indication to a second charge protection circuit of the plurality of charge protection circuits that the first battery cell has entered the charge protection mode.

20 Claims, 8 Drawing Sheets

FIG. 1 (Conventional)

FIG. 2 (Conventional)

ARCHITECTURE FOR MULTIPLE PARALLEL SECONDARY PROTECTORS FOR BATTERY CELLS

TECHNICAL FIELD

Embodiments relate to battery technology, specifically architectures for synchronizing parallel-connected battery cells.

SUMMARY

Embodiments disclosed herein improve architectures for parallel-connected battery cells in battery packs. In one embodiment, a battery pack includes a plurality of battery cells connected in parallel to an output voltage rail of the battery pack. The battery pack further includes a first indicator resistor having a first terminal and a second terminal, the first terminal is connected to the output voltage rail. The battery pack further includes a plurality of charge protection circuits corresponding to the plurality of battery cells, including a first charge protection circuit, where the first charge protection circuit is configured to detect that a first battery cell corresponding to the first charge protection circuit has triggered one or more undesirable charge protection states to enter a charge protection mode; shut off a first charge transistor for the first battery cell to prevent charging of the first battery cell in response to the first battery cell entering the charge protection mode; and pull down a voltage of the first indicator resistor at the second terminal in response to the first battery cell entering the charge protection mode. The voltage pull down provides an indication to a second charge protection circuit of the plurality of charge protection circuits that the first battery cell has entered the charge protection mode.

A further embodiment provides a charge protection circuit for use in a battery pack having a plurality of battery cells. The charge protection circuit includes a first logic gate configured to detect triggering of one or more undesirable charge protection states for a first battery cell of the plurality of battery cells and provide an output indicative thereof. The charge protection circuit further includes a pull down transistor having a first terminal connected to an indicator resistor, a second terminal connected to ground, and a control terminal connected to the output of the first logic gate, the indicator resistor connected to an output voltage rail of the battery pack. The output of the first logic gate causes the pull down transistor to conduct and pull down the voltage of the indicator resistor to ground in response to detecting that the one or more undesirable charge protection states are triggered for the first battery cell. The charge protection circuit further includes a comparator configured to detect the voltage pull down of the indicator resistor due to another battery cell of the plurality of battery cells triggering the one or more undesirable charge protection states for the another battery cell, and provide an output indicative thereof. The charge protection circuit further includes a second logic gate, connected to the outputs of the first logic gate and the comparator, configured to generate an output that provides a control input to a first charge transistor to control charging of the first battery cell.

A further embodiment provides a method of providing charge protection and discharge protection of battery pack that includes a plurality of battery cells connected in parallel. The method includes detecting that a first battery cell of the plurality of battery cells has triggered one or more undesirable charge protection states to enter a charge protection mode. The method further includes terminating charging of the first battery cell in response to the detection that the first battery cell has entered the charge protection mode. The method further includes pulling down a voltage across a first indicator resistor that is common to the plurality of battery cells at the parallel connection of the plurality of battery cells. The method further includes detecting the voltage pull down across the first indicator resistor. The method further includes terminating charging of at least a second battery cell of the plurality of battery cells in response to the detection of the voltage pull down across the first indicator resistor.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact.

Conventional Systems

Figure 1:
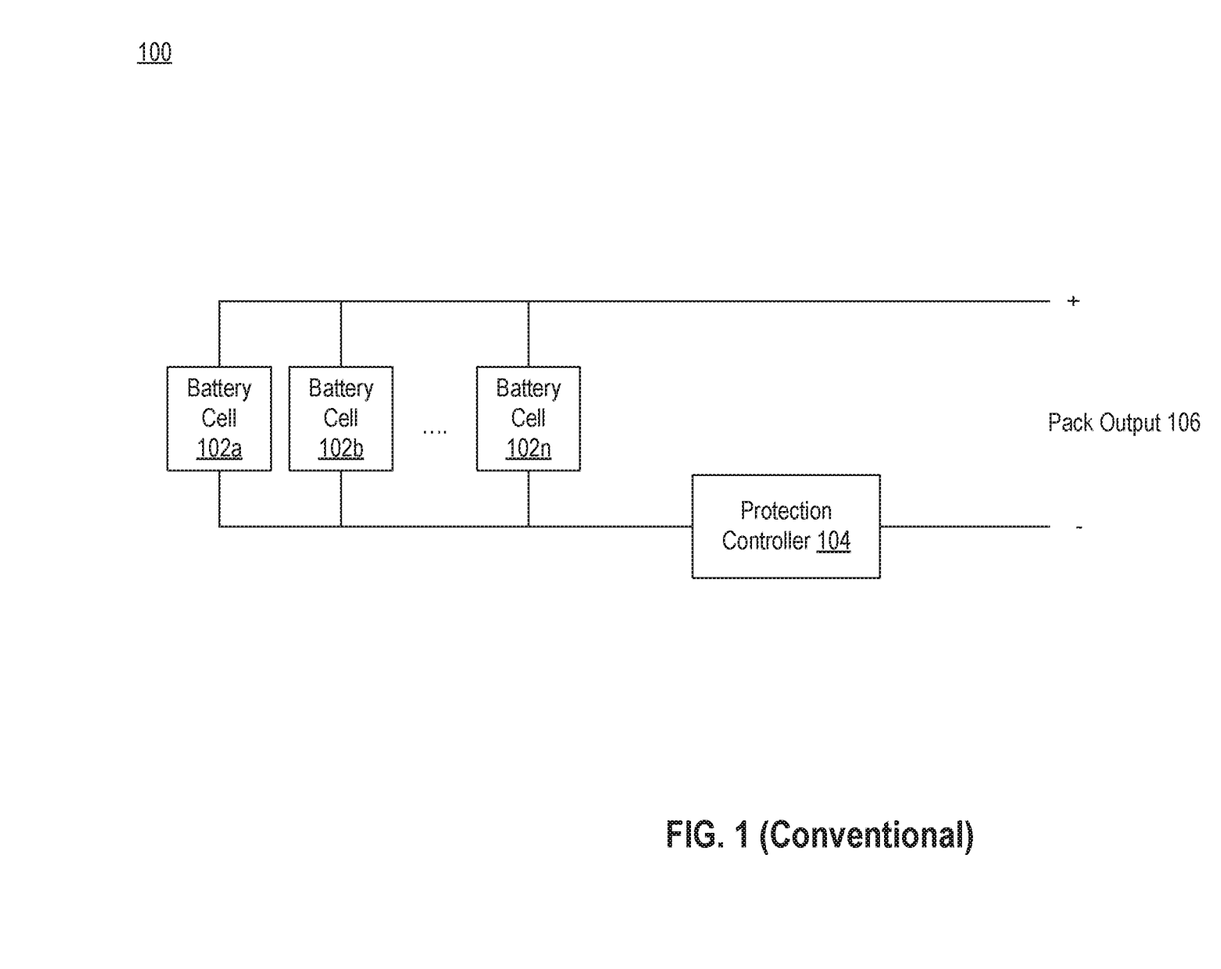
FIG. 1 illustrates a conventional system for protecting parallel-connected battery cells.

FIG. 1. illustrates a conventional system 100 for protecting parallel-connected battery cells. Battery cells may be herein referred to as "cells" for convenience. The cells are represented as {102a, 102b ..., 102n} in FIG. 1. The cells can be any type of rechargeable battery cell such as a lithium-ion cell. The system 100 includes a protection controller 104 connected in series with the battery cells. The protection controller 104 controls the ability of current to flow to the cells, and for the cells to provide a voltage across a battery pack output 106.

The protection controller 104 refers to a circuit for detecting a plurality of undesirable states that the cells may enter. Based on detecting the plurality of undesirable states, the protection controller 104 can cutoff or shut off the current flow to the cells such that the cells are no longer able to charge or discharge.

Consider charge currents to be positive values and discharge current being negative values. The undesirable states refer to instances where the cells have too much (OCC, SCC) or too little (OCD, SCD) current going into, or out of, the cells and/or too much or too little voltage across the cells. Examples of undesirable states include: an overly high voltage on a cell (OVP), an overly low voltage on a cell (UVP), an overly high current in the charge direction on a cell (OCC), an excessively high current higher than OCC on a cell (SCC), an overly low current in the discharge direction on a cell (OCD), an excessively low current or lower than OCD on a cell (SCD), as examples. These undesirable states are known in the art and for the purposes of discussion in this disclosure it is assumed the conditions giving rise to these undesirable states and the methods of detecting these states are known and will not be explained in further detail.

Continuing with the example, system 100 has shortcomings because its architecture can lead to undesirable current distributions amongst the cells. This is because there are no limits on how currents divide amongst the cells. As a result, situations arise where some cells can have more or less voltages across them than other cells. When this occurs and the protection controller 104 shuts off the current flow to the cells, the cells will attempt to rebalance due to the uneven distribution of voltages and due to any variation in impedance connections between the cells. This rebalancing can result in the cells with more voltage discharging current into cells with less voltage, resulting in surges of current into the cells that have less voltage. These surges of current may result in unstable current distributions that can damage the cells, due in part to the relatively low impedance between the cells.

Figure 2:
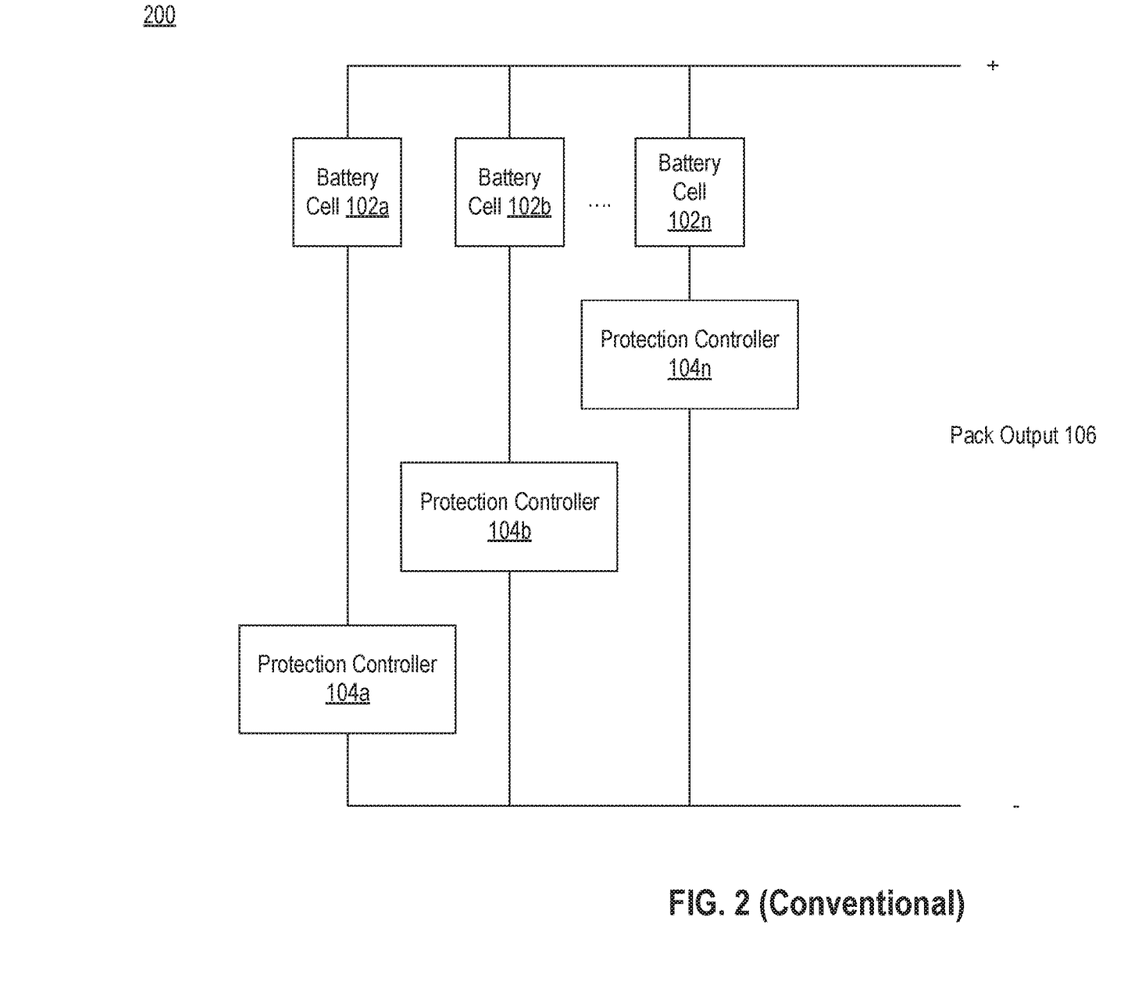
FIG. 2 illustrates a further conventional system for protecting parallel-connected battery cells.

FIG. 2 illustrates another conventional system 200 for protecting parallel-connected battery cells. System 200 differs from system 100 in that instead of having one protection controller 104 to protect all the cells, system 200 provides a protection controller 104 for each of the cells. The protection controllers for each of the cells are represented as {104a, 104b . . . , 104n} in FIG. 2. The purpose of adding the protection controller 104 for each of the cells is to be able to detect an undesirable state for each cell individually, such that the charging and discharging of each cell are controlled.

System 200, however, also has shortcomings. For example, if a cell, for example cell 102a, reaches an OVP state and the protection controller 104a, which is associated with cell 102a, shuts off current to cell 102a, cells 102b and/or 102n continue to charge and discharge. When discharge of the battery pack starts, energy will only be pulled from the cells that did not activate their protection, for example, cells 102b and/or 102n. Because cell 102a has its protection controller 104a activated it will not discharge until the voltage across its body diode is greater than the "turn on" voltage of the body diode. This means that the cells 102b and 102n will discharge one full diode before cell 102a. This becomes a problem once cell 102a exits the OVP state because it will once again connect to the other cells. Because of the difference in voltages amongst the cells, the cells will attempt to rebalance voltage between themselves. However, because of the differences in voltage amongst the cells, excessive discharge currents will flow between the cells with less voltage, for example between cells 102a, 102b, and/or 102n. This again results in surges of currents between the cells, similar to the situation described with respect to FIG. 1, which may damage these cells in a similar manner.

System for Protecting Cells with Synchronization

Figure 3:
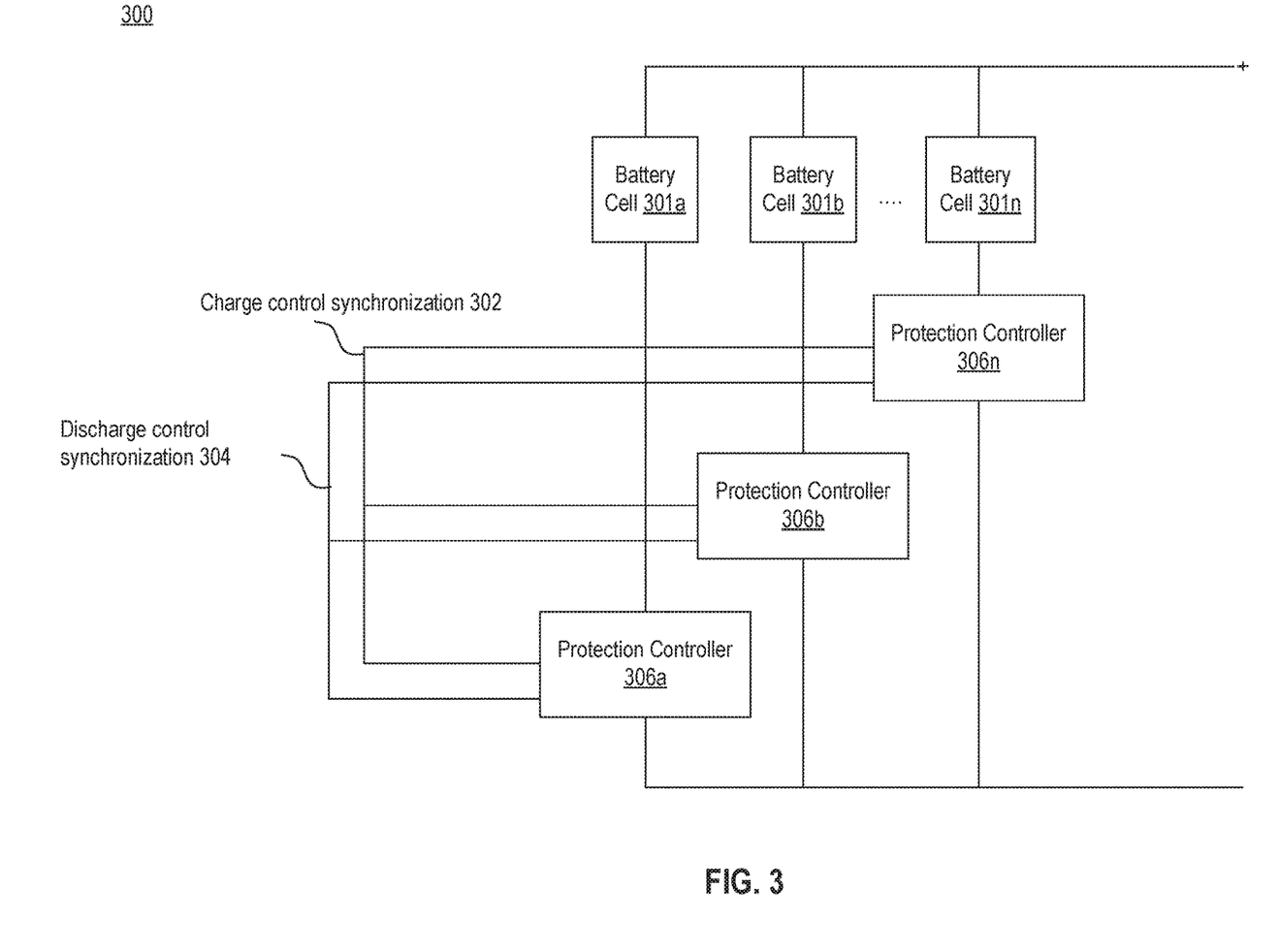
FIG. 3 illustrates a system for protecting parallel-connected battery cells with synchronization between cells according to embodiments.

FIG. 3 illustrates a system 300 for protecting parallel-connected battery cells 301 with synchronization between cells according to embodiments. The battery cells 301 are represented as {301a, 301b . . . , 301n} in FIG. 3. System 300 can be used in a battery pack. The synchronizations include a charge control synchronization 302 and a discharge control synchronization 304.

The charge control synchronization 302 refers to synchronizing the cells to shut off current to all the cells if any one protection controller 306 associated with a cell detects an undesirable state with respect to the charging of the cell and enters into a charge protection mode based on detecting the same. The protection controllers are represented as {306a, 306b . . . , 306n} in FIG. 3. These undesirable states include the SCC, OCC, and OVP states.

The discharge control synchronization 304 refers to synchronizing the cells to shut off current to all the cells if any one protection controller 306 associated with a cell detects an undesirable state with respect to the discharging of the cell and enters into a discharge protection mode based on detecting the same. These undesirable states include the SCD, OCD, and UVP states.

System 300 provides the charge control synchronization 302 and the discharge control synchronization 304 by providing connections that couple the protection controllers associated with each of the cells so that a single signal is detected and sent to each protection controller 306 when any one protection controller 306 detects an undesirable state and shuts off current to its cell. How the synchronization mechanism works will be discussed further below.

Figure 4:
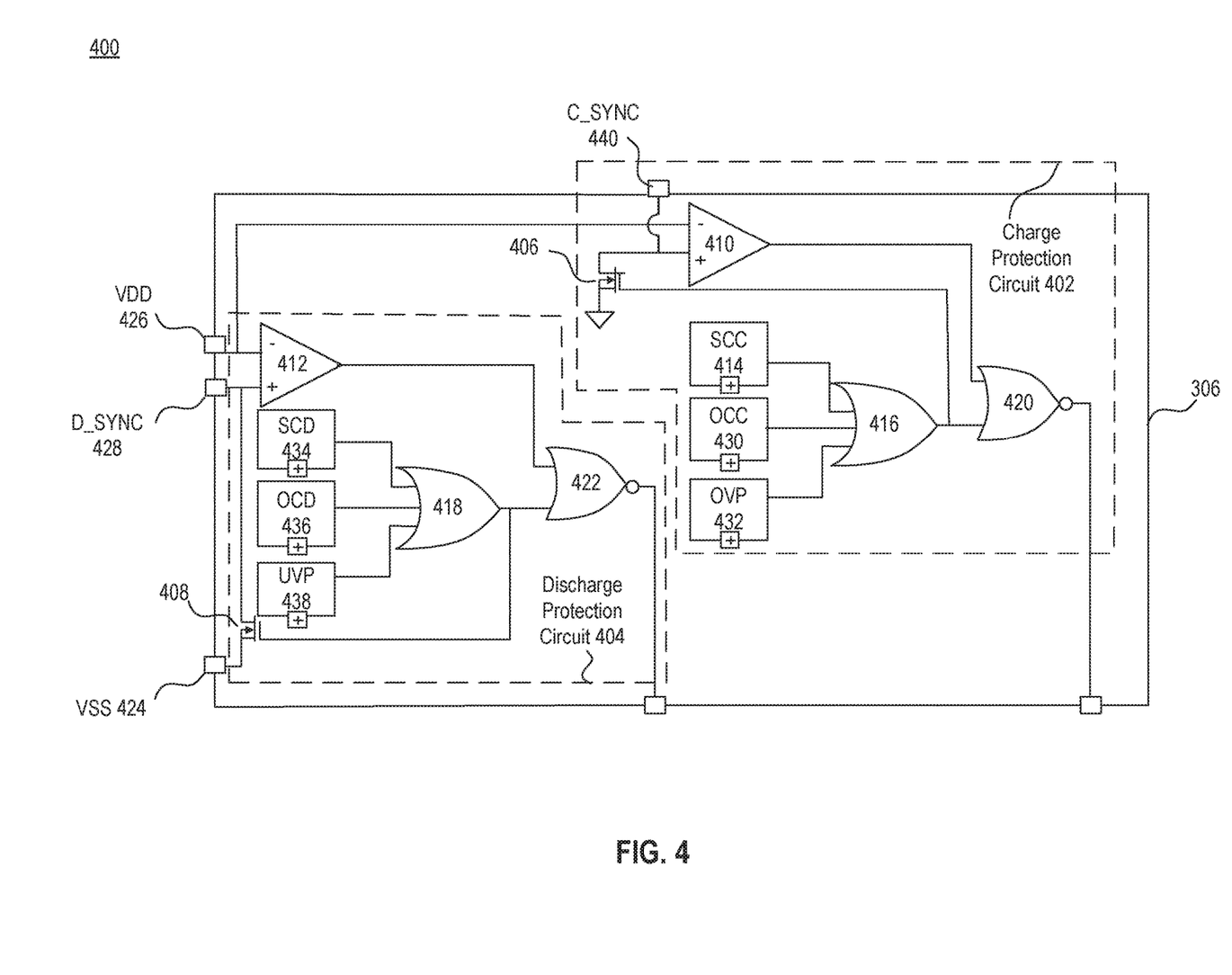
FIG. 4 illustrates a circuit for a protection controller with synchronization controls according to embodiments.

FIG. 4 illustrates a circuit 400 for a protection controller 306 with synchronization controls according to embodiments. Circuit 400 is used in system 300 of FIG. 3 to provide the charge control synchronization 302 and the discharge control synchronization 304. The circuit 400 includes two sub-circuits, which are a charge protection circuit 402 and a discharge protection circuit 404. The charge protection circuit 402 implements the charge control synchronization 302 functionality and the discharge protection circuit 404 implements the discharge control synchronization 304 functionality. Each will be described further below.

The charge protection circuit 402 includes a first logic gate 416, a comparator 410, a second logic gate 420, a pull down transistor 406, and a plurality of sub-circuits configured to detect the undesirable states with respect to the charging of a cell associated with the charge protection circuit 402. The plurality of sub-circuits can include a SCC detection circuit 414, an OCC detection circuit 430, and an OVP detection circuit 432, each of which operate to detect their respective undesirable state. The components of the SCC detection circuit 414, the OCC detection circuit 430, and the OVP detection circuit 432 are known and will not be discussed further.

Continuing with the example, the first logic gate 416 is configured to detect the triggering of one or more of the SCC, OCC, and OVP states. For example, in one embodiment, the first logic gate 416 is an OR logic gate configured to detect the triggering of the cell entering into the SCC, OCC, or OVP state. The detection of the undesired state is done via the SCC detection circuit 414, the OCC detection circuit 430, or the OVP detection circuit 432. Once the SCC, OCC, or OVP state is detected, the respective SCC detection circuit 414, the OCC detection circuit 430, or the OVP detection circuit 432 sends a logic signal, for example a logic "1" signal, to the input of the first logic gate 416 which then outputs the logic "1" signal as the output of the first logic gate 416, consistent with the operation of an OR gate or equivalent logic thereof.

The output of the first logic gate 416 connects to the pull down transistor 406. In one embodiment, the pull down transistor 406 can be a MOSFET transistor. The pull down transistor 406 has three terminals a control terminal, a first terminal, and a second terminal, where the control terminal couples to the output of the first logic gate 416. The first terminal of the pull down transistor 406 couples to a terminal of the charge protection circuit 402 from which an external signal shared and detected by all of the other protection controllers in a system with multiple cells and multiple protection controllers is received. The external signal indicates that a charge protection circuit 402 has shut off current to a cell. In FIG. 4, the terminal is labeled as C_SYNC 440. The second terminal of the pull down transistor 406 connects to a ground.

The first terminal of the pull down transistor 406 further connects to an input terminal of the comparator 410. The comparator 410 is configured to detect a voltage pull down due to another cell entering into an undesirable state with respect to the charging of the cell. The comparator 410 has another input terminal connected to a positive output voltage rail of a battery pack. In FIG. 4, the positive output voltage rail is indicated by VDD 426. The comparator 410 has an output connected to the input of a second logic gate 420.

The second logic gate 420 is configured to generate a control input to control a transistor that when switched "on" and "off" can control charging of the cell. The second logic gate 420 has a further input connected to the output of the first logic gate 416. In one embodiment, the second logic gate 420 is a NOR logic gate. The second logic gate 420 generates the control input by, for example, detecting whether the output of the comparator 410 or the first logic gate 416 is a logic "1" signal. If a logic "1" signal is detected, the second logic gate 420 can output a logic "0" signal that is used as the control input for a charge transistor to shut off the charge transistor as a result of the logic "0" signal, as will be further described in FIG. 5. As a result, the current to the cell is controlled to cut off the charging of the respective cell.

The discharge protection circuit 404 includes the same components as the charge protection circuit 402, and is connected in a same manner, except that the discharge protection circuit 404 includes a plurality of sub-circuits configured to detect the undesirable states with respect to the discharging of a cell associated with the discharge protection circuit 404. The plurality of sub-circuits can include a SCD detection circuit 434, an OCD detection circuit 436, and a UVP detection circuit 438. The components of the SCD detection circuit 434, the OCD detection circuit 436, and the UVP detection circuit 438 are known and will not be discussed further.

The discharge protection circuit 404 includes a first discharge logic gate 418, a discharge comparator 412, a second discharge logic gate 422, and a discharge pull down transistor 408. The first discharge logic gate 418 is the same as the first logic 416 and performs the same functionality except the first discharge logic gate 418 is configured to detect the triggering of the SCD, OCD, and UVP states. For example, the first discharge logic gate 418 is an OR logic gate configured to detect the triggering of the cell entering into the SCD, OCD, or UVP state. The detection is done via the SCD detection circuit 434, the OCD detection circuit 436, or the UVP detection circuit 438. Once the SCD, OCD, or UVP state is detected, the SCD detection circuit 434, the OCD detection circuit 436, or the UVP detection circuit 438 sends a logic signal, for example a logic "1" signal, to the input of the first discharge logic gate 418, which then outputs the logic "1" signal as the output of the first discharge logic gate 418.

The output of the first discharge logic gate 418 connects to the discharge pull down transistor 408. The discharge pull down transistor 408 is the same as the pull down transistor 406 and performs the same functionality. In one embodiment, the discharge pull down transistor 408 can be a MOSFET transistor. The discharge pull down transistor 408 has three terminals, a control terminal, a first terminal, and a second terminal. The control terminal couples to the output of the first discharge logic gate 418. The first terminal of the discharge pull down transistor 408 couples to a terminal of the discharge protection circuit 404 from which an external signal shared and detected by all of the protection controllers in a system with multiple cells and multiple protection controllers is received. The external signal indicates that a discharge protection circuit 404 has shut off current to its corresponding cell. In FIG. 4, the terminal is labeled as D SYNC 428. The second terminal of the discharge pull down transistor 408 couples to a negative voltage (or ground) of a battery pack. In FIG. 4, the negative voltage of the battery pack is indicated by VSS 424.

The first terminal of the discharge pull down transistor 408 further couples to an input terminal of the discharge comparator 412. The discharge comparator 412 can be the same as the comparator 410 and performs the same functionality. The discharge comparator 412 is configured to detect a voltage pull down due to another cell entering into an undesirable state with respect to the discharging of the cell. The discharge comparator 412 has another input terminal connected to the positive voltage rail of the battery pack, as indicated by VDD 426. The discharge comparator 412 has an output connected to the input of the second discharge logic gate 422.

The second discharge logic gate 422 may be the same as the second logic gate 420 and performs the same functionality. The second discharge logic gate 422 is configured to generate a control input to control a transistor that when switched "on" and "off" can control discharging of the cell, as will be further described in reference to FIG. 5. The second discharge logic gate 422 has a further input connected to the output of the first discharge logic gate 418. The second discharge logic gate 422 is a NOR logic gate. By way of example, the second discharge logic gate 422 can generate the control input by, for example, detecting whether the output of the discharge comparator 412 or the first discharge logic gate 418 is a logic "1" signal. If a logic "1" signal is detected, the second discharge logic gate 422 can output a logic "0" signal that is used as the control input for a charge transistor to control the charge transistor to shut off as a result of the logic "0" signal. As a result, the current to the respective cell is controlled to cut off the discharging of the cell.

Figure 5:
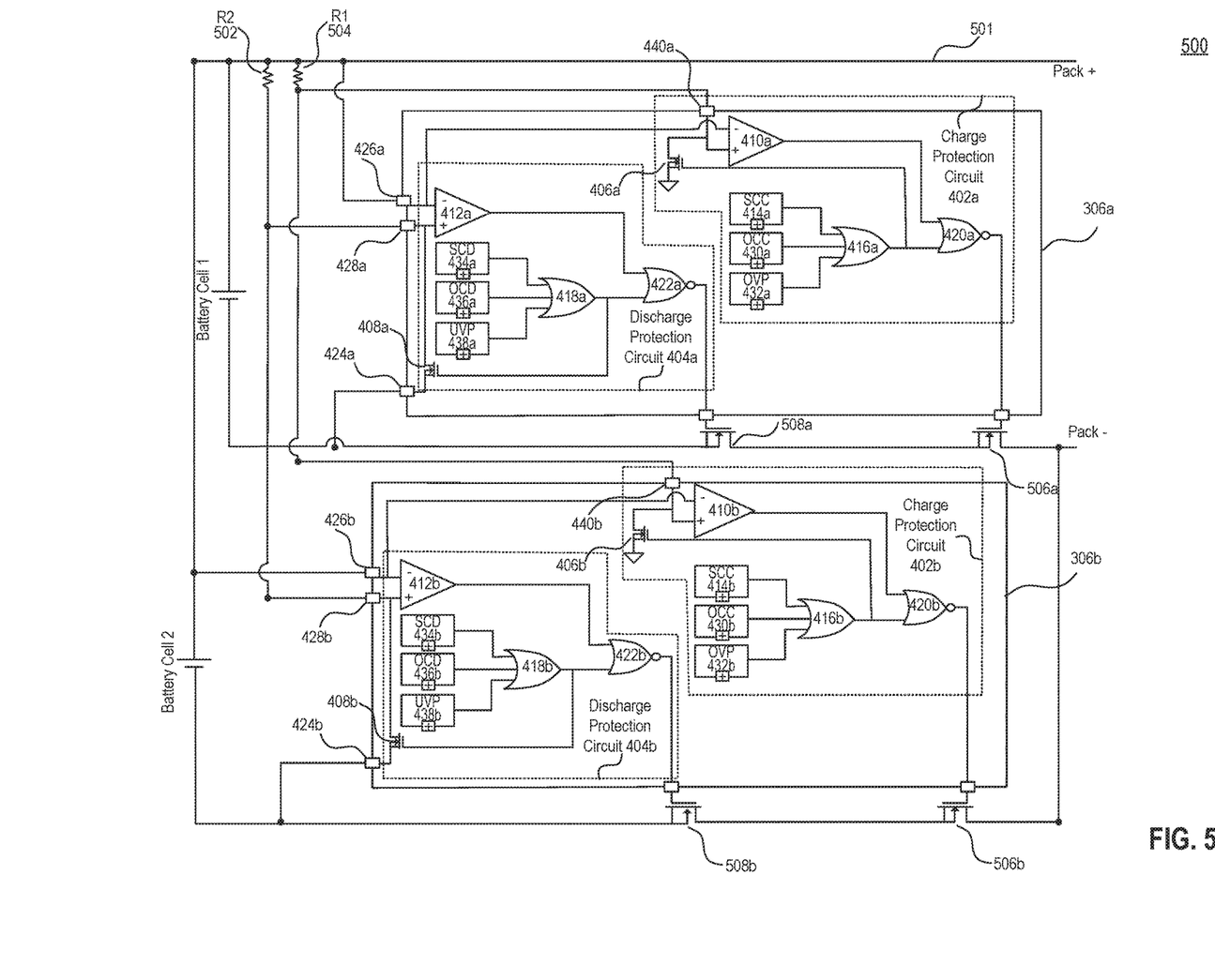
FIG. 5 illustrates a battery pack for protecting parallel-connected battery cells with synchronization between cells according to embodiments.

FIG. 5 illustrates a battery pack 500 for protecting parallel-connected battery cells with synchronization between cells according to embodiments. FIG. 5 shows an embodiment with multiple cells and multiple protection controllers. The protection controllers are implemented using circuit 400 of FIG. 4. In FIG. 5, the protection controllers are labeled {306a, 306b}, and correspond to battery cells 1 and 2, respectively. The protection controllers include the charge protection and discharge protection circuits. In FIG. 5, charge protection circuits are labeled {402a, 402b} and the discharge protection circuits are labeled {404a, 404b}. While FIG. 5 shows an embodiment where two cells are connected in parallel, this is merely exemplary and for ease of description. Any number of cells can be implemented. Each of the charge protection and discharge protection circuits 402a, 402b, 404a, and 404b is associated with a corresponding cell 1 or 2.

Continuing with the example, FIG. 5 shows how the cells are connected in parallel to form a battery pack 500. For example, each of cell 1 and 2 is connected to an output voltage rail 501 of the battery pack 500 in parallel so as to contribute voltage and current to the output voltage rail 501. In an embodiment, battery pack also has two indicator resistors, each having a first terminal and a second terminal. The two indicator resistors will be referred to as a first indicator resistor 504 and a second indicator resistor 502. The indicator resistors provide battery pack 500 with the ability to synchronize between the cells by acting as a detection mechanism that generates a voltage drop across each indicator resistor if an undesirable state is entered by any one of the cells. As a result of the voltage drop, the charge protection and discharge protection circuits, which are connected to the indicator resistors, detect the voltage drop and determine that a cell has entered into an undesirable state, and generate a control input to a transistor to shut off current to their associated cells.

By way of example, in the case of the first indicator resistor 504, the first indicator resistor 504 is part of the charge control synchronization 302 mechanism of FIG. 3, and as a result synchronizes all the cells to shut off current to the cells if any cell enters an undesirable state with respect to the charging of the cell. The first indicator resistor 504 has two terminals, a first terminal and a second terminal. The first terminal is connected to the output voltage rail 501. The second terminal is connected to the C_SYNC 440 terminals for each of the charge protection circuits 402a and 402b. In FIG. 5, the C_SYNC terminals are labeled {440a, 440b}.

Assuming that Battery Cell 1 has entered into an undesirable state with respect to the charging of the cell, for example a SCC, OCC, or OVP state, the charge protection circuit 402a of FIG. 5, performs the functions and generates the same signals as discussed with respect to charge protection circuit 402 of FIG. 4 when such a state is entered so as to switch "off" a transistor to shut off current to Battery Cell 1. In FIG. 5, the transistor is labeled as a first charge transistor 506a. For example, the output of the first logic gate 416a of FIG. 5 generates a logic "1" signal responsive to SCC, OCC or OVP states being detected that sets off the chain of logic as described in FIG. 4 with respect to the charge protection circuit 402, to shut off the first charge transistor 506a. More specifically, second logic gate 420a detects the logic "1" output of first logic gate 416a and outputs a logic "0" (consistent with NOR gate logic) to cutoff first charge transistor 506a and thereby shut off current to Battery Cell 1.

In addition, and as a result of the logic "1" signal being generated by the first logic gate 416a, the logic "1" signal is transmitted to a control terminal of a pull down transistor 406a of FIG. 5. The logic "1" signal causes the pull down transistor 406a to conduct and pull a second terminal of the pull down transistor 406a to ground, which further causes a first terminal of the pull down transistor 406a to have a current flow through it such that it generates a voltage drop across the first indicator resistor 504. Herein, this voltage drop is also referred to as a pull down voltage. Because the first indicator resistor 504 is also connected to the C_SYNC 440 terminals of the other protection controllers, for example C_SYNC 440b of charge protection circuit 402b in FIG. 5, this pull down voltage is detected by charge protection circuit 402b.

The detection of the pull down voltage is done by a comparator 410b of charge protection circuit 402b, which performs similar functions as comparator 410 of FIG. 4. As a result of the detection of the pull down voltage, comparator 410b generates a logic signal, for example a logic "1" signal that is transmitted to the input of the second logic gate 420b of charge protection circuit 402b, similar to what was described in FIG. 4 with respect to the second logic gate 420. Based on the logic "1" signal, the second logic gate 420b further generates a control input, for example the logic "0" signal, which is further transmitted to a transistor to switch that transistor to an "on" or "off" state to control the charging of Battery Cell 2. In FIG. 5, the transistor is labeled as a second charge transistor 506b. Accordingly, the mechanisms provided herein enable the charge protection circuit 402b to recognize an undesired state detected in Battery Cell 1 by charge protection circuit 402a and further shut down charging of Battery Cell 2 to alleviate the undesirable current distribution issues discussed above.

While the function of the first indicator resistor 504 is described with respect to two cells, this is merely exemplary. In an embodiment with more than two cells, the mechanism proceeds in a similar manner for all the cells, by having the charge protection circuits associated with those cells similarly detect the pull down voltage across the first indicator resistor 504 and shut off current to their associated cells. In this way, battery pack 500 shuts off current to each cell substantially simultaneously across all cells when any one of the cells enters into an undesirable state with respect to the charging of a cell.

Additionally, the example above, while described as originating with the cell 1 associated with charge protection circuit 402a entering into an undesirable state with respect to charging of the cell 1, the disclosure is not limited to this embodiment. For example, any of the cells connected in parallel may enter into an undesirable state with respect to charging of the cell, and the mechanism described will function in the same manner to shut off current to the other cells. For example, if charge protection circuit 402b detects its associated cell, Battery Cell 2, has entered into an undesirable state with respect to charging of the cell, it can further generate a pull down voltage on the first indicator resistor 504. The pull down voltage is detected by charge protection circuit 402a which detects the pull down at comparator 410a and generates the logic "1" signal which further generates the same signals as previously described, and in a similar manner, to shut off charge transistor 506a to shut off current to Battery Cell 1. One skilled the art will recognize that this can be expanded to any number of battery cells and corresponding charge protection circuits.

The second indicator resistor 502 functions in a similar manner and perform similar functions as the first indicator resistor 504, except that it is part of the discharge control synchronization 304 mechanism of FIG. 3, and as a result synchronizes all the cells to shut off current to the cells if a cell enters an undesirable state with respect to the discharging of the cell.

The second indicator resistor 502 has two terminals, a first terminal and a second terminal. The first terminal is connected to the output voltage rail 501. The second terminal is connected to the D SYNC 428 terminals (shown as 428a and 428b) for each of the discharge protection circuits 404a and 404b.

Assuming that Battery Cell 1 has entered into an undesirable state with respect to the discharging of the cell, for example a SCD, OCD, or UVP state, the discharge protection circuit 404a of FIG. 5, performs the functions and generates the same signals as discussed with respect to discharge protection circuit 404 of FIG. 4 when such a state is entered, so as to switch "off" a transistor to shut off current from Battery Cell 1. In FIG. 5, the transistor is labeled as a first discharge transistor 508a. For example, the output of the first discharge logic gate 418a of FIG. 5 can generate a logic "1" signal responsive to the SCD, OCD or UVP states being detected that sets off the chain of logic as described in FIG. 4 with respect to the discharge protection circuit 404, to shut off the first discharge transistor 508a. More specifically, second logic gate 422a detects the logic "1" output of first logic gate 416a and outputs a logic "0" (consistent with NOR gate logic) to cutoff first discharge transistor 508a and thereby shut off current from the Battery Cell 1.

In addition, and as a result of the logic "1" signal being generated by the first discharge logic gate 418a, the logic "1" signal is transmitted to a control terminal of a discharge pull down transistor 408a of FIG. 5. The logic "1" signal causes the discharge pull down transistor 408a to conduct and pull a second terminal of the discharge pull down transistor 408a to ground, which further causes a first terminal of the discharge pull down transistor 408a to have a current flow through it such that it generates a voltage drop across the second indicator resistor 502. Herein, this voltage drop is also referred to as a pull down voltage. Because the second indicator resistor 502 is also connected to the D SYNC 428 terminals of the other protection controllers, for example D SYNC 428b of discharge protection circuit 404b in FIG. 5, this pull down voltage is detected by discharge protection circuit 404b.

The detection of the pull down voltage is done by discharge comparator 412b of discharge protection circuit 404b, which performs similar functions as discharge comparator 412 of FIG. 4. As a result of the detection of the pull down voltage, discharge comparator 412b generates a logic signal, for example a logic "1" signal that is transmitted to the input into the second discharge logic gate 422b of discharge protection circuit 404b, similar to what was described in FIG. 4 with respect to the second discharge logic gate 422. Based on the logic "1" signal, the second discharge logic gate 422b further generates a control input, for example the logic "0" signal (consistent with NOR gate logic), which is further transmitted to a transistor to switch that transistor to an "on" or "off" state to control the discharging of the Battery Cell 2, which is associated with discharge protection circuit 404b. In FIG. 5, the transistor is labeled as a second discharge transistor 508b. Accordingly, the mechanisms provided herein enable the discharge protection circuit 404b to recognize an undesired state detected in Battery Cell 1 by discharge protection circuit 404a and further shuts down discharging of Battery Cell 2 to alleviate the undesirable current distribution issues discussed above.

While the function of the second indicator resistor 502 is described with respect to two cells, this is merely exemplary. In an embodiment with more than two cells, the mechanism can proceed in a similar manner for all the cells, by having the discharge protection circuits associated with those cells similarly detect the pull down voltage across the second indicator resistor 502 and shut off current from their associated cells. In this way, battery pack 500 shuts off current from each cell in substantially simultaneously across all cells when any one of the cells enters into an undesirable state with respect to the discharging of a cell.

Additionally, the example above, while described as originating with the cell associated with discharge protection circuit 404a entering into an undesirable state with respect to discharging of the cell, is not limited to this embodiment. For example, any of the cells connected in parallel may enter into an undesirable state with respect to discharging of the cell and the mechanism described will function in the same manner to shut off current to the other cells. For example, if discharge protection circuit 404b detects its associated cell, Battery Cell 2, has entered into an undesirable state with respect to discharging of the cell, it can further generate a pull down voltage on the second indicator resistor 502. The pull down voltage is detected by discharge protection circuit 404a, which detects the pull down at discharge comparator 412a and generates the logic "1" signal, which further generates the same signals as previously described and in a similar manner to shut off discharge transistor 508a to shut off current from Battery Cell 1. One skilled in the art will recognize that this can be expanded to any number of battery cells and corresponding discharge protection circuits.

Figure 6:
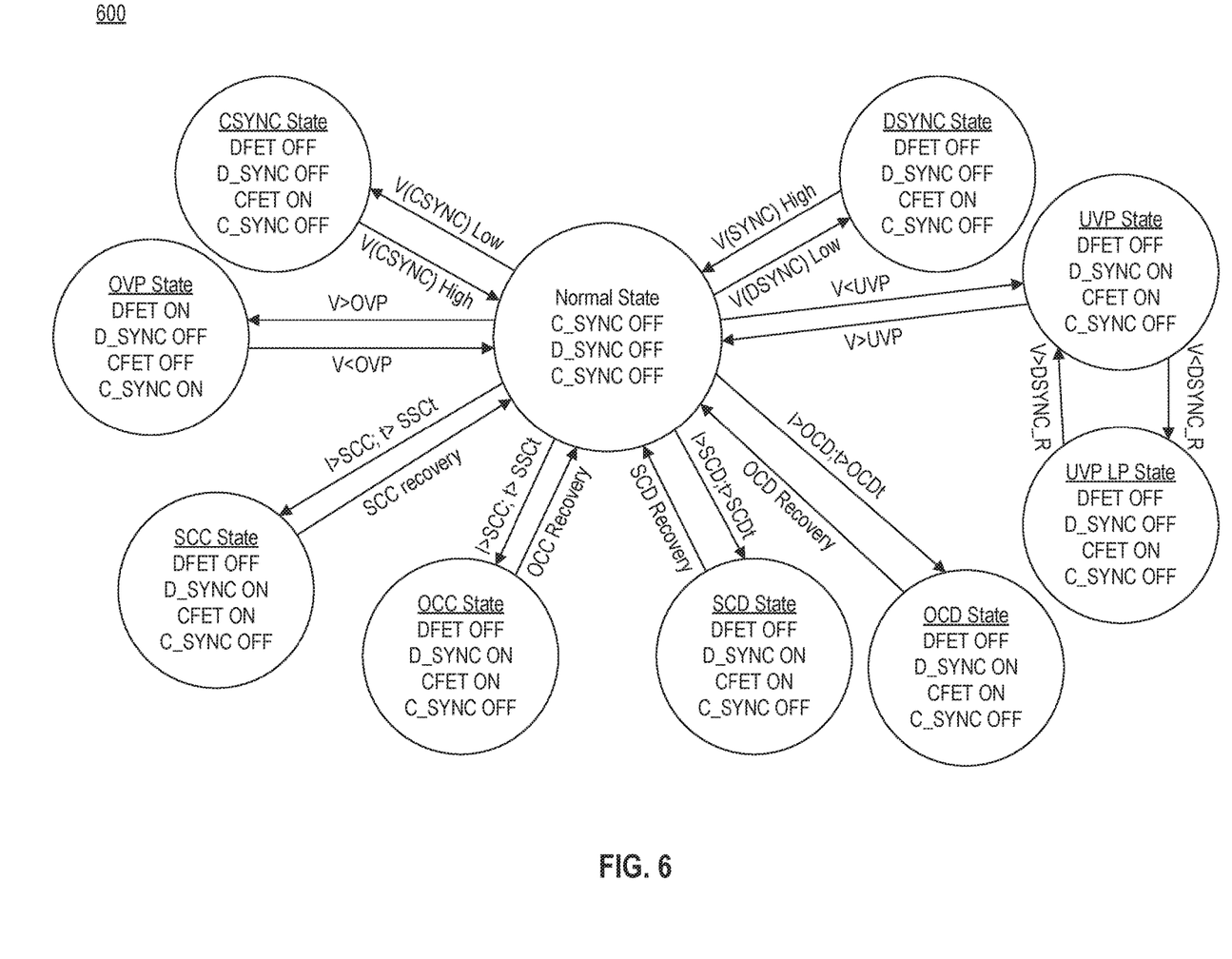
FIG. 6 illustrates a state diagram of the system for protecting parallel-connected battery cells with synchronization between cells according to embodiments.

FIG. 6 illustrates a state diagram 600 of the battery pack 500 for protecting parallel-connected battery cells with synchronization between cells according to embodiments. FIG. 6 indicates all the states and operating conditions that battery pack 500 can enter into. These states are determined based on the logic implementing battery pack 500. As previously indicated, the undesirable states and the conditions triggering them are known in the art. Therefore, the state diagram 600 is readily understood by a person of ordinary skill in the art based on the design of battery pack 500 and the previous discussion provided herein.

Figure 7:
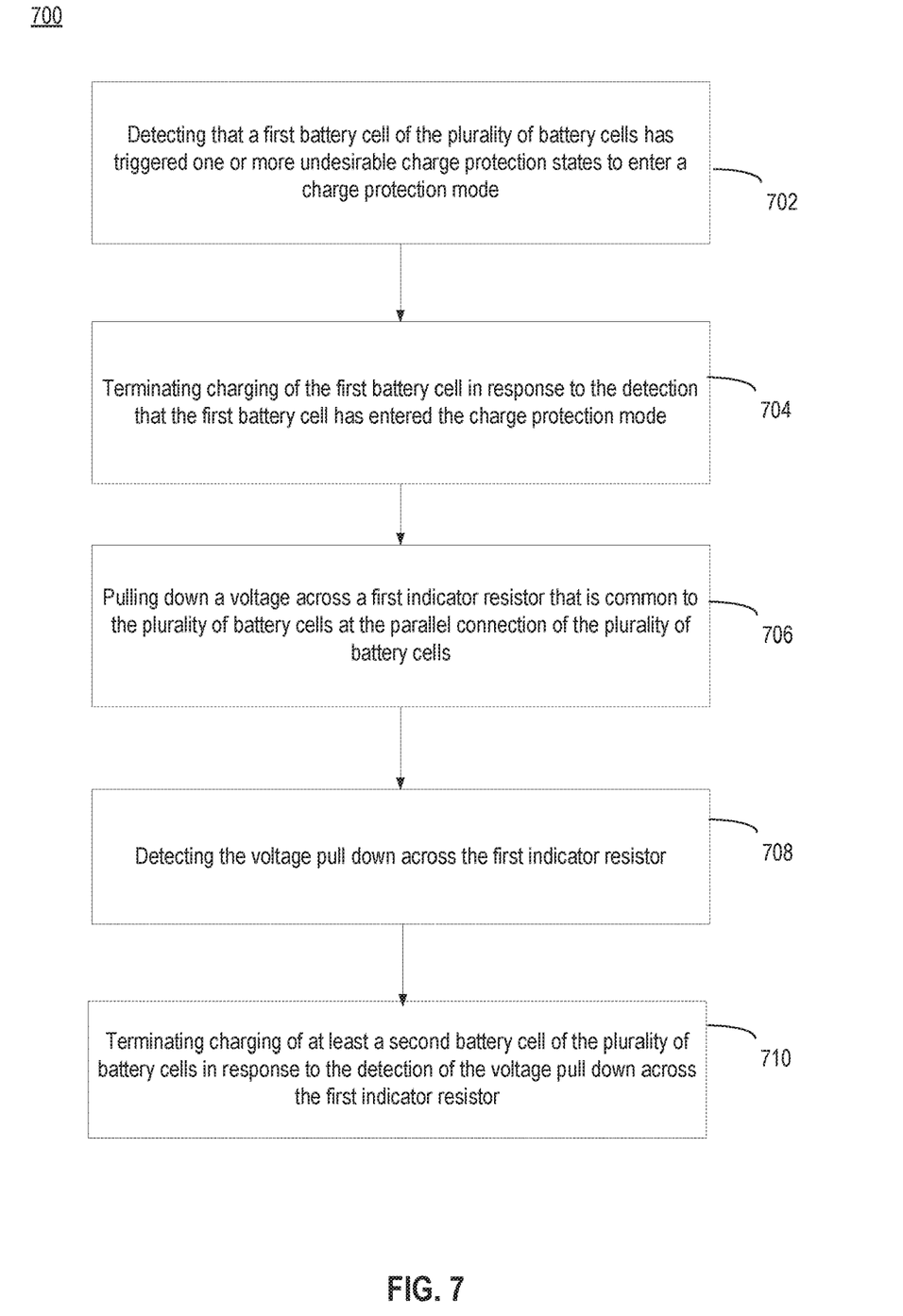
FIG. 7 illustrates a method of operating the circuit for protecting parallel-connected battery cells with synchronization between cells according to embodiments.

FIG. 7 illustrates a method 700 of operating the battery pack 500 for protecting parallel-connected battery cells with synchronization between cells according to embodiments. Method 700 includes detecting that a first cell, for example Battery Cell 1 of FIG. 5, of a plurality of battery cells has triggered one or more undesirable charge protection states to enter a charge protection mode, as shown in 702. Method 700 further includes terminating charging of the first cell in response to the detection that the first cell has entered the charge protection mode, as shown in 704. Method 700 further includes pulling down a voltage across a first indicator resistor 504 that is common to the plurality of battery cells at the parallel connection of the plurality of battery cells, for example C_SYNC 440, as shown in 706. Method 700 further includes detecting the voltage pull down across the first indicator resistor 504, as shown in 708. Method 700 further includes terminating charging of at least a second cell, for example Battery Cell 2 of FIG. 5, of the plurality of battery cells in response to the detection of the voltage pull down across the first indicator resistor 504, as shown in 710.

Figure 8:
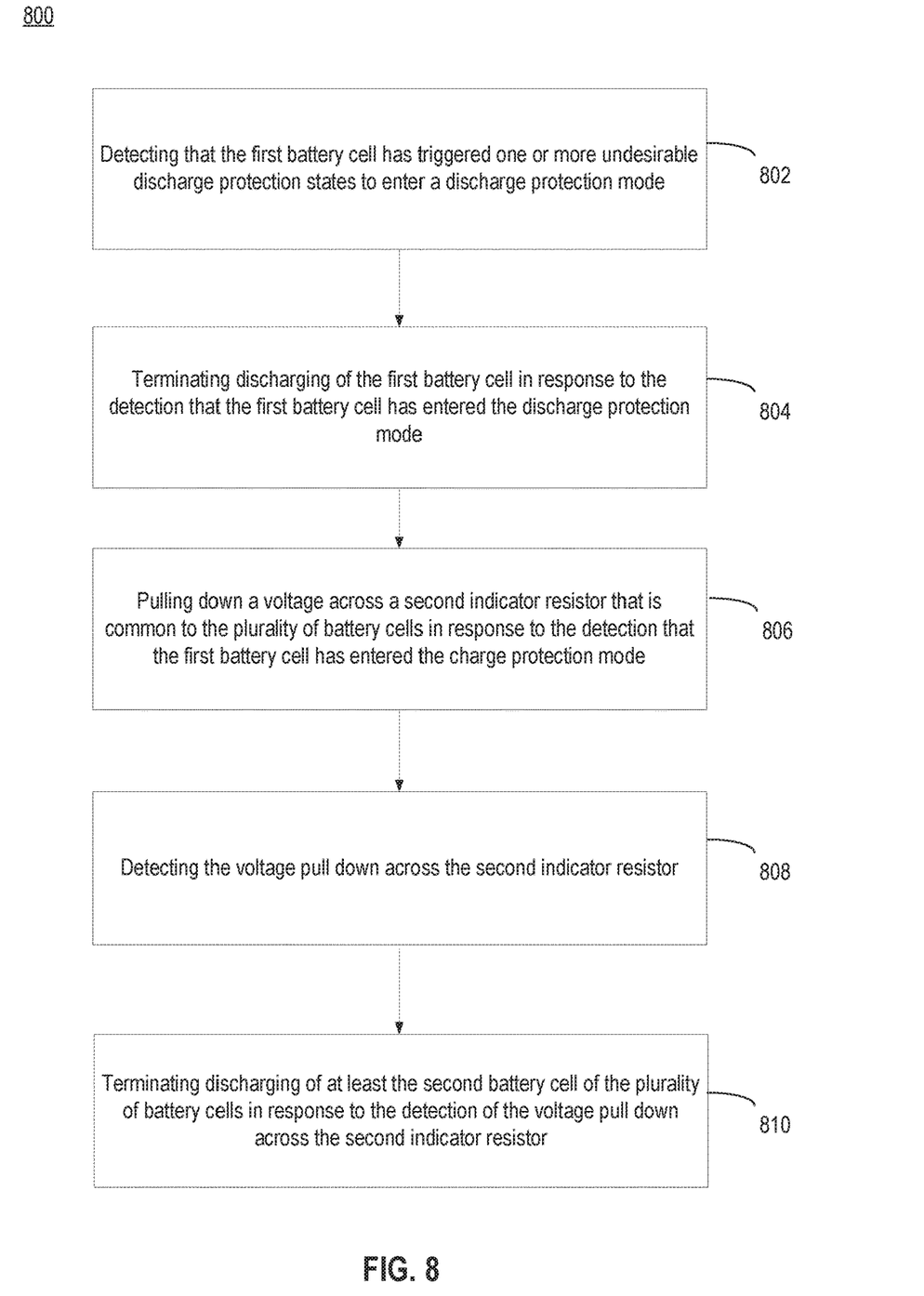
FIG. 8 illustrates a further method of operating the circuit for protecting parallel-connected battery cells with synchronization between cells according to embodiments.

FIG. 8 illustrates a further method 800 of operating the battery pack 500 for protecting parallel-connected battery cells with synchronization between cells according to embodiments. Method 800 includes detecting that the first cell, for example Battery Cell 1 of FIG. 5, has triggered one or more undesirable discharge protection states to enter a discharge protection mode, as shown in 802. Method 800 further includes terminating discharging of the first cell in response to the detection that the first cell has entered the discharge protection mode, as shown in 804. Method 800 includes pulling down a voltage across a second indicator resistor 502 that is common to the plurality of battery cells in response to the detection that the first cell has entered the charge protection mode, as shown in 806. Method 800 further includes detecting the voltage pull down across the second indicator resistor 502, as shown in 808. Method 800 further includes terminating discharging of at least the second cell of the plurality of battery cells in response to the detection of the voltage pull down across the second indicator resistor 502, as shown in 810.

As described, battery pack 500 has the ability to control the charging and discharging of each cell in a plurality of cells while providing synchronization between the cells. As a result, battery pack 500 resolves the problems of having undesirable current distributions amongst the cells due to rebalancing of currents when one cell enters into and exits out of an undesirable state associated with charging and discharging the cell. Additionally, and as a result, battery pack 500 further improves the stability of battery packs by preventing surges of currents between cells. Further, battery pack 500 also increases the life of each cell, because by preventing undesirable distributions of currents across cells, damage to the cells is avoided by such undesirable distributions.

The foregoing detailed description of the disclosure and the accompanying figures illustrate exemplary embodiments of a system for protecting parallel-connected battery cells with synchronization between cells. References in the foregoing detailed description to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The foregoing detailed description is not meant to be limiting. Rather, the scope of the disclosure is defined only in accordance with the following claims and their equivalents. It is to be appreciated that the foregoing detailed description, and not the following Abstract section, is intended to be used to interpret the claims. The Abstract section is not intended to limit the disclosure and the following claims and their equivalents in any way.

The exemplary embodiments described within the foregoing detailed description have been provided for illustrative purposes, and are not intended to be limiting. Other exemplary embodiments are possible, and modifications can be made to the exemplary embodiments while remaining within the spirit and scope of the disclosure. The foregoing detailed description has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by a plurality of processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The foregoing detailed description fully reveals the general nature of the disclosure that others can, by applying knowledge of those skilled in relevant arts, readily modify and/or adapt for various applications such exemplary embodiments, without undue experimentation, without departing from the spirit and scope of the disclosure. Therefore, such adaptations and modifications are intended to be within the meaning and number of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant arts in light of the teachings herein.

What is claimed is:

1. A battery pack comprising:
   a plurality of battery cells connected in parallel to an output voltage rail of the battery pack;
   a first indicator resistor having a first terminal and a second terminal, the first terminal connected to the output voltage rail;
   a plurality of charge protection circuits corresponding to the plurality of battery cells, including a first charge protection circuit configured to:
      detect that a first battery cell corresponding to the first charge protection circuit has triggered one or more undesirable charge protection states to enter a charge protection mode;
      shut off a first charge transistor for the first battery cell to prevent charging of the first battery cell in response to the first battery cell entering the charge protection mode; and
      pull down a voltage of the first indicator resistor at the second terminal in response to the first battery cell entering the charge protection mode, wherein the voltage pull down provides an indication to a second charge protection circuit of the plurality of charge protection circuits that the first battery cell has entered the charge protection mode.

2. The battery pack of claim 1, wherein the second charge protection circuit is configured to:
   detect the voltage pull down at the second terminal of the first indicator resistor; and
   shut off a second charge transistor for a second battery cell corresponding to the second charge protection circuit, to prevent charging of the second battery cell in response to the detection of the voltage pull down at the second terminal of the first indicator resistor.

3. The battery pack of claim 2, wherein the second charge protection circuit is further configured to:

detect that the second battery cell has triggered the one or more undesirable charge protection states to enter the charge protection mode;

shut off the second charge transistor for the second battery cell to prevent charging of the second battery cell in response to the second battery cell entering the charge protection mode; and pull down the voltage of the first indicator resistor at the second terminal in response to the second battery cell triggering the one or more undesirable charge protection states.

4. The battery pack of claim 3, wherein the first charge protection circuit is further configured to:

detect a second voltage pull down at the second terminal of the first indicator resistor caused by the second charge protection circuit due to a corresponding second battery cell entering the charge protection mode; and shut off the first charge transistor for the first battery cell to prevent charging of the first battery cell in response to the second voltage pull down of the second terminal of the first indicator resistor.

5. The battery pack of claim 1, wherein the first charge protection circuit comprises:

a first logic gate configured to detect triggering of the one or more undesirable charge protection states for the first battery cell and provide an output indicative thereof;

a comparator configured to detect the voltage pull down at the second terminal of the first indicator resistor due to another battery cell entering the charge protection mode, and provide an output indicative thereof; and a second logic gate, connected to the outputs of the first logic gate and the comparator, and providing a control input to the first charge transistor to control charging of the first battery cell.

6. The battery pack of claim 5, wherein the second logic gate is configured to shut off the first charge transistor via the control input based on:

the output of first logic gate indicating the first battery cell has triggered the one or more undesirable charge protection states to enter the charge protection mode; or the output of the comparator indicating detection of the voltage pull down at the second terminal of the first indicator resistor.

7. The battery pack of claim 5, wherein the first charge protection circuit further comprises a pull down transistor having a first terminal connected to the second terminal of the first indicator resistor, a second terminal connected to ground, and a control terminal connected to the output of the first logic gate, wherein the output of the first logic gate causes the pull down transistor to conduct and pull the second terminal of the first indicator resistor to ground in response to detection that the one or more undesirable charge protection states are triggered for the first battery cell.

8. The battery pack of claim 1, wherein the one or more undesirable charge protection states include one or more of: an overly high voltage on a cell (OVP), an excessively high current in the charge direction on a cell (OCC), and an excessively high current higher than OCC on a cell (SCC).

9. The battery pack of claim 1, further comprising:

a second indicator resistor having a first terminal and a second terminal, the first terminal of the second indicator resistor connected to the output voltage rail;

a plurality of discharge protection circuits corresponding to the plurality of battery cells, including a first discharge protection circuit configured to:

detect that the first battery cell has triggered one or more undesirable discharge protection states to enter a discharge protection mode;

shut off a first discharge transistor for the first battery cell to prevent discharging of the first battery cell based on the first battery cell entering the discharge protection mode; and pull down the voltage of the second indicator resistor at the second terminal in response to the first battery cell entering the discharge protection mode, wherein the voltage pull down provides an indication to a second discharge protection circuit of the plurality of discharge protection circuits that the first battery cell has entered the discharge protection mode.

10. The battery pack of claim 9, wherein the second discharge protection circuit is configured to:

detect the voltage pull down at the second terminal of the second indicator resistor; and shut off a second discharge transistor for a second battery cell, to prevent discharging of the second battery cell in response to detection of the voltage pull down at the second terminal of the second indicator resistor.

11. The battery pack of claim 10, wherein the second discharge protection circuit is further configured to:

detect that the second battery cell has triggered the one or more undesirable discharge protection states to enter the discharge protection mode;

shut off the second discharge transistor for the second battery cell to prevent discharging of the second battery cell in response to the second battery cell entering the discharge protection mode; and pull down the voltage of the second indicator resistor at the second terminal based on the second battery cell entering the discharge protection mode.

12. The battery pack of claim 11, wherein the first discharge protection circuit is further configured to:

detect a second voltage pull down at the second terminal of the second indicator resistor caused by the second discharge protection circuit due to the second battery cell entering the discharge protection mode; and shut off the second discharge transistor for the first battery cell to prevent discharging of the first battery cell in response to the second battery cell entering the discharge protection mode.

13. The battery pack of claim 9, wherein the one or more undesirable discharge protection states include one or more of: an overly low voltage on a cell (UVP), an excessive current in the discharge direction on a cell (OCD), an excessively low current or lower than OCD on a cell (SCD).

14. A charge protection circuit for use in a battery pack having a plurality of battery cells, the charge protection circuit comprising:

a first logic gate configured to detect triggering of one or more undesirable charge protection states for a first battery cell of the plurality of battery cells and provide an output indicative thereof;

a pull down transistor having a first terminal connected to an indicator resistor, a second terminal connected to ground, and a control terminal connected to the output of the first logic gate, the indicator resistor connected to an output voltage rail of the battery pack;

wherein the output of the first logic gate causes the pull down transistor to conduct and pull down the voltage of the indicator resistor to ground in response to detecting that the one or more undesirable charge protection states are triggered for the first battery cell;

a comparator configured to detect the voltage pull down of the indicator resistor due to another battery cell of the plurality of battery cells triggering the one or more undesirable charge protection states for the another battery cell, and provide an output indicative thereof; and a second logic gate, connected to the outputs of the first logic gate and the comparator, configured to generate an output that provides a control input to a first charge transistor to control charging of the first battery cell.

15. The charge protection circuit of claim 14, wherein the second logic gate is configured to shut off the first charge transistor via the control input based on:

the output of first logic gate indicating the first battery cell has triggered the one or more undesirable charge protection states; or the output of the comparator indicating detection of the voltage pull down of the indicator resistor.

16. The charge protection circuit of claim 15, wherein the first logic gate is an OR gate and the second logic gate is a NOR gate.

17. A method of providing charge protection and discharge protection of a battery pack that includes a plurality of battery cells connected in parallel, the method comprising:

detecting that a first battery cell of the plurality of battery cells has triggered one or more undesirable charge protection states to enter a charge protection mode;

terminating charging of the first battery cell in response to the detection that the first battery cell has entered the charge protection mode;

pulling down a voltage across a first indicator resistor that is common to the plurality of battery cells at the parallel connection of the plurality of battery cells;

detecting the voltage pull down across the first indicator resistor; and terminating charging of at least a second battery cell of the plurality of battery cells in response to the detection of the voltage pull down across the first indicator resistor.

18. The method of claim 17, wherein the pulling down the voltage across the first indicator resistor occurs substantially simultaneously with the terminating charging of the first battery cell, based on an output of a same logic gate.

19. The method of claim 17, further comprising:

detecting that the first battery cell has triggered the one or more undesirable discharge protection states to enter a discharge protection mode;

terminating discharging of the first battery cell in response to the detection that the first battery cell has entered the discharge protection mode;

pulling down a voltage across a second indicator resistor that is common to the plurality of battery cells in response to the detection that the first battery cell has entered the charge protection mode;

detecting the voltage pull down across the second indicator resistor; and terminating discharging of at least the second battery cell of the plurality of battery cells in response to the detection of the voltage pull down across the second indicator resistor.

20. The method of claim 19, wherein the pulling down the voltage across the second indicator resistor occurs substantially simultaneously with the terminating discharging of the first battery cell, based on an output of a same logic gate.

* * * * *